United States Patent [19]
Gewertz

[11] 3,753,285

[45] Aug. 21, 1973

[54] METHOD OF FORMING A DECORATIVE PICTURE FRAME

[75] Inventor: Harry R. Gewertz, Whittier, Calif.

[73] Assignee: Intercraft Industries Corporation, Chicago, Ill.

[22] Filed: Feb. 23, 1972

[21] Appl. No.: 228,520

[52] U.S. Cl.............. 29/425, 29/416, 29/DIG. 30, 29/DIG. 47, 40/152, 264/132, 264/148, 264/152
[51] Int. Cl.......................................... B23p 17/00
[58] Field of Search.................... 29/425, 416, 412, 29/417, 526, DIG. 1, DIG. 30, DIG. 47; 40/152, 154; 264/132, 177 R, 148, 152; 156/61

[56] References Cited
UNITED STATES PATENTS

| | | | |
|---|---|---|---|
| 1,025,688 | 5/1912 | Crittall | 29/416 X |
| 1,772,780 | 8/1930 | Milone | 160/395 |
| 3,189,136 | 6/1965 | Stickney | 29/416 X |
| 3,284,889 | 11/1966 | Flitman et al. | 264/177 R X |
| 3,406,054 | 10/1968 | Chaffee | 264/152 X |

Primary Examiner—Charles W. Lanham
Assistant Examiner—V. A. DiPalma
Attorney—William E. Anderson et al.

[57] ABSTRACT

A method of forming a decorative picture frame including the steps of extruding an elongated thermoplastic molding having a formed longitudinal groove, providing an elongated strip having a decorative surface and adapted to be received in the groove, attaching the decorative strip to the molding, cutting the molding into predetermined lengths and assembling the lengths into a frame.

4 Claims, 3 Drawing Figures

Patented Aug. 21, 1973 3,753,285
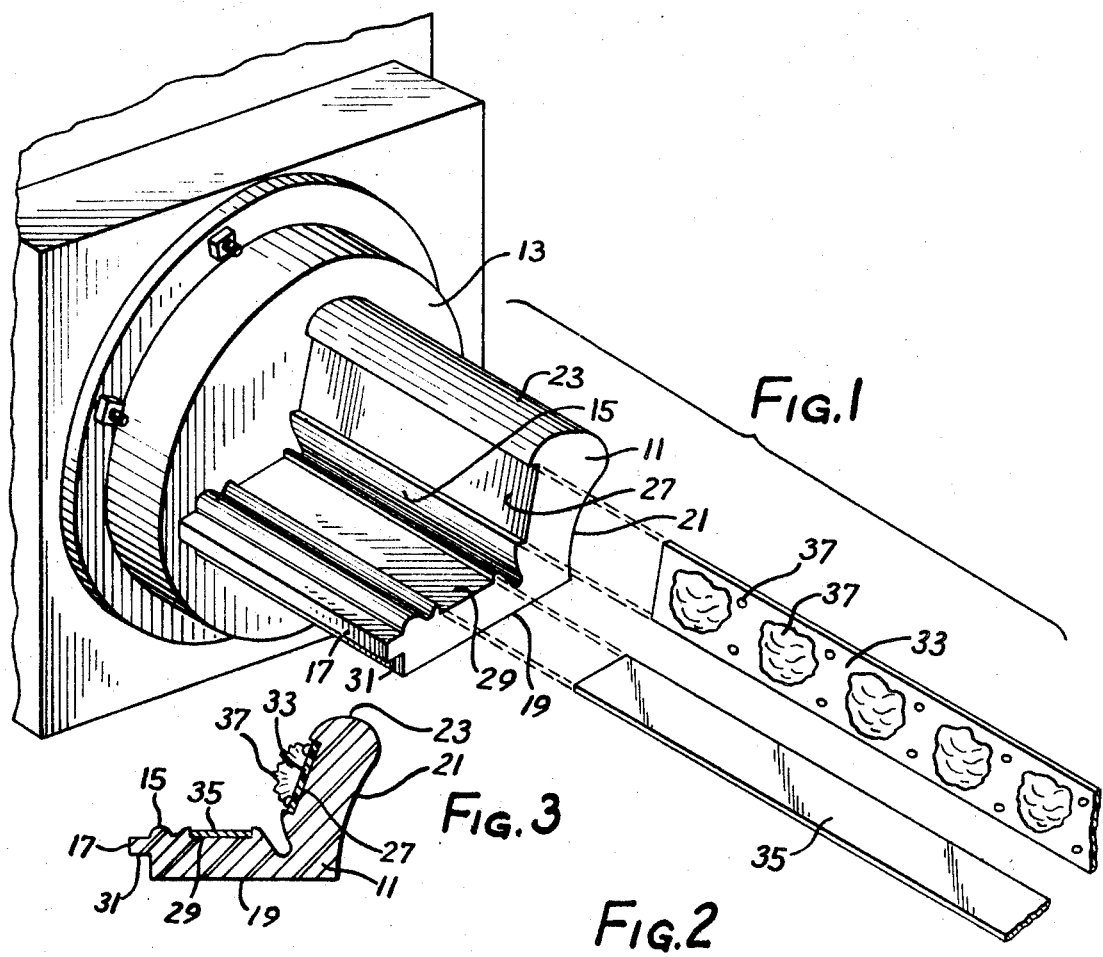
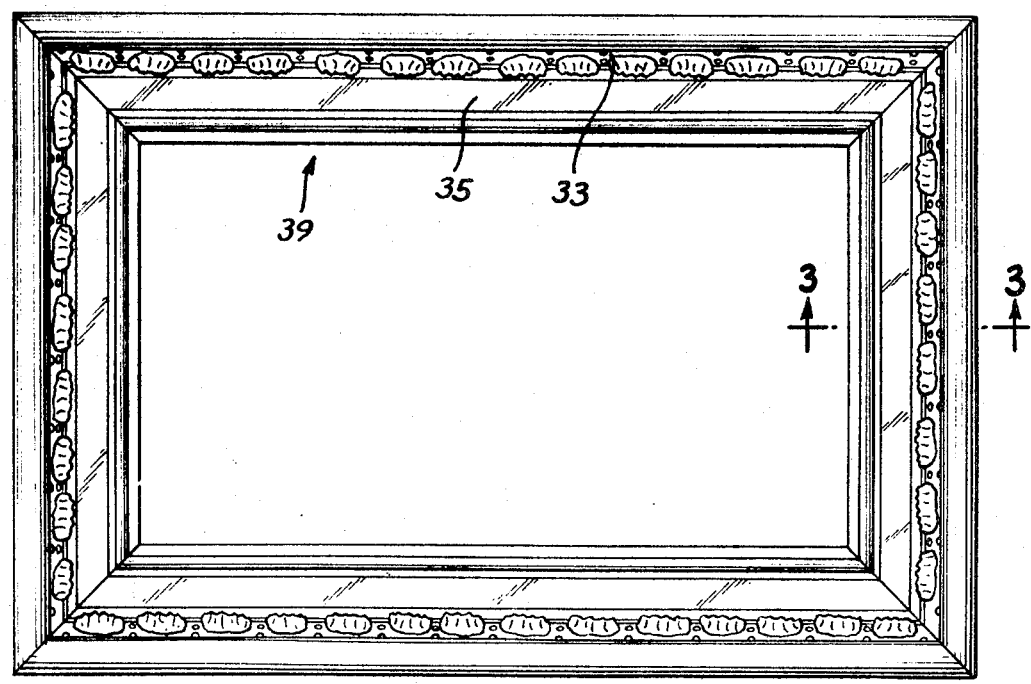

3,753,285

METHOD OF FORMING A DECORATIVE PICTURE FRAME

This invention relates to a method of making plastic picture frames and, more particularly, provides a method whereby decorative thermoplastic picture frame may be formed from an extruded thermoplastic molding.

Traditionally, ornate picture frames have been formed of wood and, in the more costly picture frames the wood was hand carved to provide a decorative border to the picture being displayed. Later methods were devised to more efficiently manufacture such frames in which a milled molding was coated with a thick layer of a slurry-like mixture comprised typically of glue and sawdust which was then passed under a stamping roller to provide the desired ornate design. More recently, picture frames have been molded using thermoplastic resins. Because thermoplastic resins are not readily machinable it has been necessary, in order to make such frames, to provide a full size mold having the desired decorative features. However, such molds are expensive and manufacturing costs are substantial when each picture frame must be individually molded.

It is the object of this invention to provide an improved method of forming a decorative thermoplastic picture frame.

This and other objects and improvements of the invention are more particularly set forth in the following detailed description and in the accompanying drawings of which:

FIG. 1 is a perspective view of a thermoplastic molding being extruded in accordance with the present invention. To this extruded molding are about to be applied decorative strip inserts;

FIG. 2 is a front view of a completed picture frame formed in accordance with the present invention; and FIG. 3 is an enlarged section view of the picture frame of FIG. 2 taken along lines 3—3.

While the invention will be described in connection with certain preferred embodiments, it will be understood that it is not intended to limit the invention to these particular embodiments.

Typically, extrusion of thermoplastic is accomplished by placing a suitable thermoplastic in a cylindrical chamber of an extrusion apparatus wherein it is heated to extrusion temperature. The end of the extrusion cylinder contains a die having an orifice of the desired shape and the fluid thermoplastic is forced through the die opening under pressure. The thermoplastic in effect squirts out of the opening as a continuous bar having the same cross sectional shape as the die opening. Thus a molding formed by extrusion will have a smooth surface which is uniform in cross section.

Very generally the present invention provides a method whereby a picture frame which closely resembles a hand carved wooden picture frame may be formed from an extruded thermoplastic molding. A thermoplastic molding is formed by extrusion to have a surface especially adapted to receive a longitudinally continuous inlay. An elongated inlay in the form of a strip having a decorative surface is then affixed to this molding and the molding cut into lengths suitable for forming a picture frame. The molding lengths are then joined together to form the desired picture frame.

Referring to the drawings, there is shown a picture frame formed in accordance with the present invention. A thermoplastic molding is initially formed by extrusion, and the finished picture frame has decorative features in relief.

In FIG. 1 there is shown a thermoplastic molding 11 being extruded through a die 13. This molding 11 has a shape in cross section which is uniform throughout and generally L-shaped. The molding 11 is defined by a display surface 15, an interior edge 17, a backside 19, a top surface 21 and a forward edge 23. The display surface 15 is provided with two continuous, parallel, longitudinal, planar grooves 27 and 29, groove 27 being located adjacent the forward edge 23 and groove 29 being located adjacent the interior edge 17. These planar grooves are each formed of a predetermined depth and width which remains constant throughout the length of the planar groove. The interior edge 17 is formed to have a rearward facing shoulder 31, adapted to receive a picture for display. The back side 19 of the molding 11 is adapted to be hung on a wall and extends from the rearward facing shoulder 31 to the edge of the top surface 21.

Elongated decorative strips suitable for emplacement in planar grooves 27 and 29 are shown as strips 33 and 35 respectively. Each of these strips is formed to have a base which is substantially rectangular in cross-section and of a depth and width corresponding to the dimensions of the respective planar grooves to allow the strips to be received in the planar grooves.

These strips 33 and 35 may be emplaced in the planar grooves 27 and 29 as the molding 11 is extruded in a continuous manner, or the molding 11 may be formed in predetermined lengths which would correspond to precut lengths of decorative strips and the strips then applied to the molding. These strips are attached to the molding by a suitable method of lamination such as gluing the strip to the molding. The strips and the planar grooves may be formed to result in a finished molding which appears to be a single piece of material; the juncture between the strips and the molding being not readily apparent to the casual observer. Also, as shown in the illustrated embodiment, the base of the strips may be formed to be more shallow than the planar grooves whereby the surrounding molding may serve as a background which will highlight the features of the strips. The entire molding including the strips may be painted to provide the frame with a unipartite appearance.

The strip 33 which is emplaced in planar groove 27 adjacent the forward edge 23 is formed to make the completed picture frame resemble a hand carved wooden picture frame. Strip 33 is provided with raised irregular features 37 which extend beyond the upper surface of the base of the strip and the display surface 15 of the molding 11. These raised irregular features 37 resemble hand carved surfaces in relief. This strip may be made of any suitable material and may have any of a wide variety of textures and finishes. In a preferred embodiment the strip 33 is made of a thermoplastic material and is formed by molding to have the desired configuration. Other methods of forming this strip would include vacuum forming or cutting rolled sheets of the plastic into strips having the required dimensions and using a stamping roller to produce a strip having the required final dimensions and the desired design.

In the preferred embodiment the strip 35, which is emplaced in planar groove 29 adjacent the interior edge 17, has a substantially flat frontal surface. This strip 35 may be formed of plastic as was strip 33, or it may be made of cloth, metal, or other suitable material. If mirrored strips are desired, glass mirrors may also be utilized, the glass being cut into thin strips of the appropriate dimensions.

After the strips 33 and 35 have been affixed in the planar grooves 27 and 29, the completed molding may be adapted to form a rectangular picture frame. This may be done by cutting the molding into predetermined lengths with the severed edge of the molding being at an angle of 45° to the longitudinal axis of the molding. Four corresponding molding lengths may then be joined together to form a rectangular picture frame 39 as seen in FIG. 2. The four corners of the picture frame may be joined by gluing them together, or clasps similar to staples may be driven into the back side of the molding at the corners of the picture frame. It is not necessary that the completed picture frame be rectangular as the molding may be adapted to form many alternative shaped and sized picture frames.

Various of the features of this invention are set forth in the following claims:

What is claimed is:

1. The method of forming a decorative picture frame which simulates the appearance of a carved wood picture frame comprising the steps of extruding an elongated thermoplastic molding having a continuous longitudinal planar groove formed therein; providing an elongated decorative strip adapted to be received in the groove of the molding, said strip having a decorative surface; attaching the decorative strip to the molding; cutting the molding into predetermined lengths, and assembling the lengths of molding into a polygonal picture frame.

2. The method of claim 1 including the steps of extruding an elongated thermoplastic molding having a plurality of spaced apart parallel continuous longitudinal planar grooves formed therein, providing a plurality of elongated decorative strips each adapted to be received in a groove of the molding and having a decorative surface, the decorative surface of one of the strips having a different appearance than the decorative surface of another of the strips, and attaching the decorative strips to the molding.

3. The method of claim 1 including the step of the decorative strip having been first formed to have a decorative surface in relief.

4. The method of claim 1 wherein the surface of the decorative strip defines raised, irregular features.

* * * * *